United States Patent
Voon et al.

(10) Patent No.: US 7,430,124 B2
(45) Date of Patent: Sep. 30, 2008

(54) HOUSING HAVING A CABLE CONDUIT AND RELATED SYSTEMS AND METHODS

(75) Inventors: Sze-Moey Voon, Cupertino, CA (US); Thomas S. Neal, Cupertino, CA (US); Ameer Karim, Cupertino, CA (US); Joel Jacobs, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/800,235

(22) Filed: Mar. 12, 2004

(65) Prior Publication Data

US 2005/0199410 A1    Sep. 15, 2005

(51) Int. Cl.
*H05K 7/00* (2006.01)
(52) U.S. Cl. .................. 361/728; 361/826
(58) Field of Classification Search ............. 174/35 R, 174/35 MS, 95, 68.1, 48; 361/800, 797, 361/752, 796, 825–826
See application file for complete search history.

(56) References Cited

U.S. PATENT DOCUMENTS

| | | | | |
|---|---|---|---|---|
| 4,392,701 A | * | 7/1983 | Weidler ..................... 439/76.1 |
| 4,578,702 A | * | 3/1986 | Campbell, III ............. 725/149 |
| 4,758,924 A | * | 7/1988 | Dillon et al. ................ 361/692 |
| 4,963,966 A | * | 10/1990 | Harney et al. ............... 725/149 |
| 5,143,868 A | * | 9/1992 | Caveney et al. ............ 439/535 |
| 5,372,225 A | * | 12/1994 | Joynes et al. ............ 191/12.2 R |
| 5,421,741 A | * | 6/1995 | David et al. ................. 439/405 |
| 5,655,933 A | * | 8/1997 | Skowronski ................ 439/654 |
| 5,702,345 A | * | 12/1997 | Wood et al. ................. 600/109 |
| 5,798,485 A | * | 8/1998 | Rohde et al. .............. 174/35 R |
| 5,828,272 A | * | 10/1998 | Romerein et al. ........... 333/100 |
| 5,892,653 A | * | 4/1999 | Nishimuta et al. .......... 361/643 |
| 5,896,268 A | * | 4/1999 | Beavers ...................... 361/690 |
| 6,072,981 A | * | 6/2000 | Inoue ......................... 725/149 |
| 6,304,428 B1 | * | 10/2001 | Sato ........................... 361/600 |
| 6,368,149 B1 | * | 4/2002 | Schmidt et al. ............. 439/519 |
| 6,590,777 B2 | * | 7/2003 | Morino et al. .............. 361/736 |
| 6,667,436 B2 | * | 12/2003 | Takami et al. ............. 174/35 R |
| 6,733,341 B1 | * | 5/2004 | Bugg ......................... 439/638 |
| 6,801,787 B1 | * | 10/2004 | Page et al. ................ 455/556.1 |
| 6,987,665 B2 | * | 1/2006 | Pavlacka et al. ............ 361/641 |
| 2005/0170687 A1 | * | 8/2005 | Goh ........................... 439/501 |
| 2005/0231080 A1 | * | 10/2005 | Torrance ................... 312/223.6 |

* cited by examiner

*Primary Examiner*—Hung S Bui

(57) ABSTRACT

A housing for a computer system includes a conduit operable to protect a communication medium, such as a cable, that couples a peripheral device of the system to processing circuitry of the system. The conduit includes a bottom, a sidewall and a top that together define a passage in which the communication medium may be disposed. The passage includes a first opening and a second opening for allowing the communication medium disposed in the passage to extend through the passage. By disposing all or section of the communication medium in the passage, the conduit reduces the coupler's exposure between the interface of the processing circuitry and a peripheral device coupled to the interface, and thus protects the communication medium and the interface.

26 Claims, 3 Drawing Sheets

HOUSING HAVING A CABLE CONDUIT AND RELATED SYSTEMS AND METHODS

CROSS-REFERENCED APPLICATIONS

This application is related to the following patent applications: U.S. Utility patent application Ser. No. 10/800,280 titled STORAGE COMPARTMENT WITH POSITIONABLE HOLDER FOR HOLDING A COMPACT DISC, and filed on 12 Mar. 2004; U.S. Utility patent application Ser. No. 10/800,234, titled STORAGE COMPARTMENT FOR STORING ITEMS, AND RELATED SYSTEMS AND METHODS, and filed on 12 Mar. 2004; U.S. Design patent application Ser. No. 29/201,340, titled PORTION OF A HOUSING FOR PROCESSING CIRCUITRY OR OTHER SIMILAR ITEM, and filed on 12 Mar. 2004; and U.S. Design patent application Ser. No. 29/201,290, titled POWER SWITCH FOR PROCESSING CIRCUITRY OR OTHER SIMILAR ITEM, and filed on 12 Mar. 2004, which are incorporated by reference.

BACKGROUND

Many computer systems include processing circuitry for performing various computer functions, such as receiving and generating data and executing programs to perform specific tasks, one or more peripheral devices that the circuitry may read data from, write data to, or otherwise control, and a communication medium, such as, for example, a cable, to couple the peripheral devices to the circuitry. The computer systems also typically include an interface having one or more connectors for coupling the communication medium to the processing circuitry. Examples of peripheral devices include a keyboard, a mouse, a printer, a portable storage device, a personal data assistant (PDA), a wireless receiver/transceiver and/or a camera.

FIG. 1 is a perspective view of a computer system 10 that includes an interface 12 having multiple connectors 13a-13g, a housing 14 for protecting processing circuitry (not shown), and a peripheral device 16 (here a digital camera). A communication medium 18 (here a cable) couples the camera 16 to the circuitry via the connector 13f so that the circuitry can read data stored in the camera. Because the interface 12 is typically located on a vertical wall of the housing 14 to protect the connector 13f, the cable 18 is typically long enough to allow one to place the camera 16 on top of the housing 14 or some other horizontal surface while the camera remains coupled to the processing circuitry.

Unfortunately, a long cable 18 can cause problems. For example, if the camera 16 is placed on top of the housing 14, the cable 18 may lie on top of the housing or next to the housing as it extends between the camera and the interface 12, and thus may lie exposed between the camera and interface. When exposed, one may snag the cable 18 with one's arm, hand or some other object, and thus could pull the cable and damage the camera 16, the cable 18, the connector 13f, or the processing circuitry.

SUMMARY

In one aspect of the invention, a housing for a computer system includes a passage operable to hold a communication medium for coupling a device outside the housing to processing circuitry of the system. The passage includes a first opening and a second opening for allowing the communication medium disposed in the passage to extend through the passage. By disposing all or section of the communication medium in the passage, the conduit reduces the coupler's exposure between the interface of the processing circuitry and a peripheral device coupled to the interface, and thus protects the communication medium.

DETAILED DESCRIPTION

Figure 1:
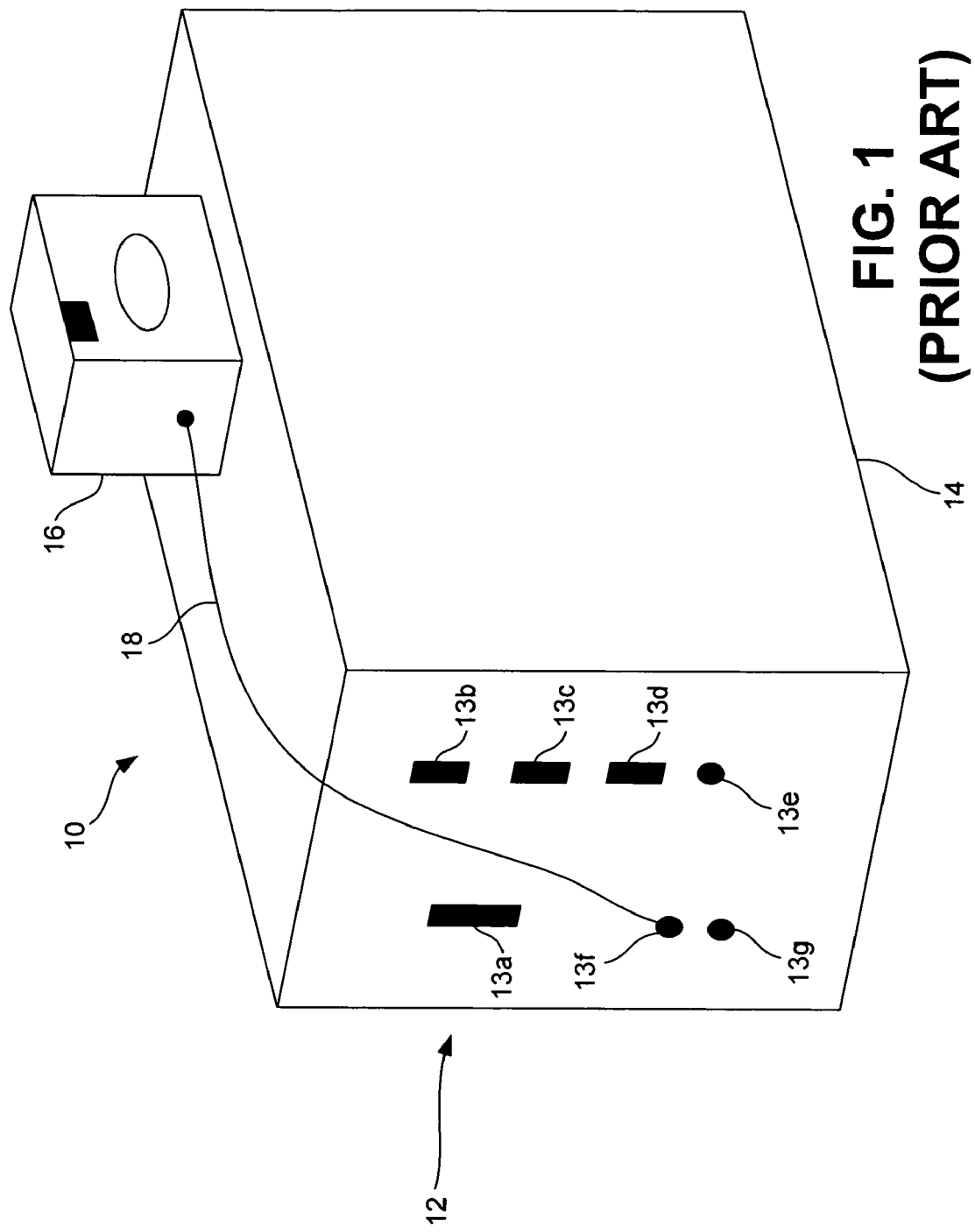
FIG. 1 is a perspective view of a conventional computer system that includes a conventional camera placed on top of the system's housing and coupled to the system's processing circuitry with a cable.
Figure 2:
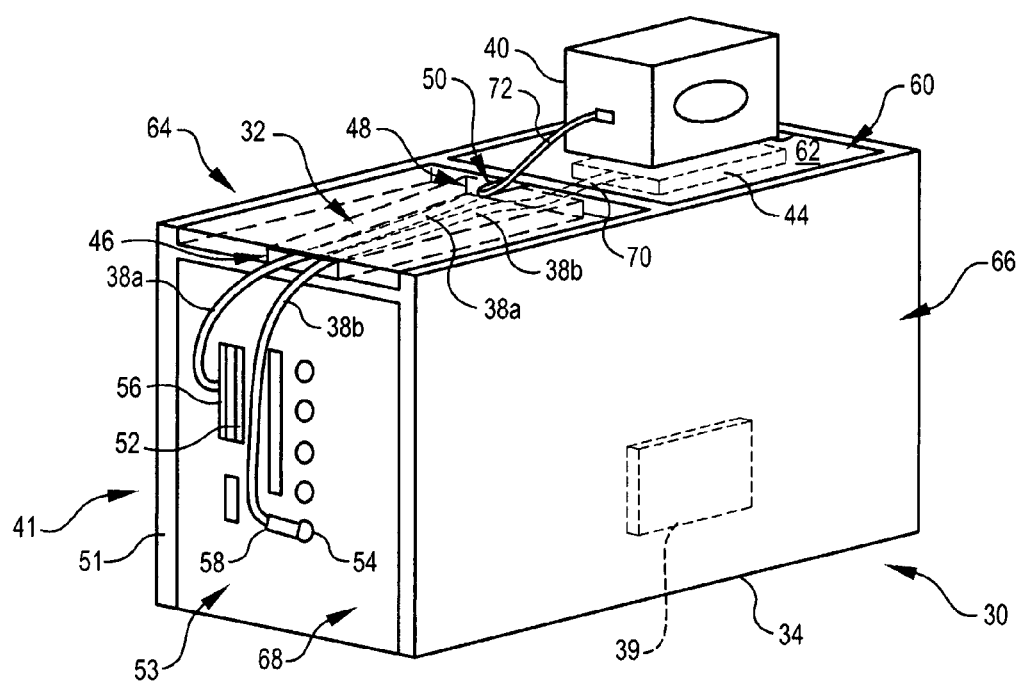
FIG. 2 is a perspective view of a computer system that incorporates a cable conduit according to an embodiment of the invention.

FIG. 2 is a perspective view of a computer system 30, such as a server or personal computer (PC), which incorporates a passage 32 according to an embodiment of the invention. The passage 32 may be incorporated into a housing 34 of the computer system 30 as shown, or the passage may be incorporated into a conduit (not shown) that is separate from the computer system. In the passage 32 (discussed in greater detail in conjunction with FIG. 3) one or more communication media, such as, for example cables and wires (here two cables 38a and 38b) are disposed. The cable 38a couples a peripheral device 40 (here a camera) to an interface 41 and the cable 38b couples another peripheral device 44 (here a portable, electronic personal data manager—PDM) to the interface. The passage 32 includes one or more openings through which the cables 38a and 38b may extend to couple the camera 40 and PDA 44, respectively, to the interface 41. For example, the passage 32 includes a first opening 46 through which the cables 38a and 38b extend, a second opening 48 through which the cable 38b extends, and an auxiliary opening 50 through which the cable 38a extends. By routing the cables 38a and 38b through the passage 32, the housing 34 reduces the cables' exposure, and thus reduces the cables' chances of getting inadvertently snagged and/or pulled. Therefore, the housing 34 protects the cables 38a and 38b, peripheral devices 40 and 44, and the interface 41 from damage.

The housing 34 includes a back 51 comprising an opening 53 that holds the interface 41. The interface 41 couples the cables 38a and 38b to processing circuitry (not shown) to allow the circuitry to read data from and/or write data to the camera 40 and PDA 44. For example, the circuitry, which includes a processor 39, may read data stored in the camera 40 to generate a digital photograph. The interface 41 includes attachments—that is, connectors—52 and 54 (only two of eight connectors shown are referred to with reference numbers) that mate with corresponding connectors 56 and 58 of the cables 38a and 38b, respectively, to couple the cables to the interface.

Still referring to FIG. 2, the housing 34 may also include a storage compartment 60 for storing one or more items (here the PDA 44). The storage compartment 60 includes a door 62 that may be positioned to close the storage compartment (shown) and to open the storage compartment (not shown). With the door 62 closed, the storage compartment protects the PDA 44 and supports the camera 40. The storage compartment 60 also includes a passage (not shown) through a rear wall (not shown) to allow the PDA 44 to be coupled to the cable 38b via the opening 48 when the door 62 is closed. The storage compartment is further discussed in U.S. patent application Ser. No. 10/800,234 titled STORAGE COMPARTMENT FOR STORING ITEMS, AND RELATED SYSTEMS AND METHODS and filed Mar. 12,2004, which was previously incorporated herein by reference.

Other embodiments are contemplated. For example, although the passage 32 is shown located along the top 64 of the housing 34, the passage 32 may be located along the sides 66 (only one shown), the front (not shown) or the back 68 of the housing 34, or any combination of these locations. In another example, the computer system 30 may not include the storage compartment 60, and the second opening 48 may expose the passage to the environment outside the housing 34. In yet another example, the passage 32 may extend closer to the interface 41 to further reduce the exposure of the cables 38a and 38b. In yet another embodiment, some or all of the connectors of the interface 41 may be located inside the passage 32 or close to the second opening 48. In yet another example, although the computer system 30 is shown in FIG. 2 with the housing 34 in a tower configuration, the housing may be in a desktop configuration.

To couple the processing circuitry (not shown) to the camera 40 and the PDA 44, the cables 38a and 38b may be routed through the passage 32 as desired. For example, in one embodiment the PDA 44 is coupled to the circuitry before the camera 40 is coupled to the circuitry. Assuming, the PDA 44 is not initially stored in the storage compartment 60, one first moves the door 62 to open the storage compartment. Next, one may insert the end 70 of the cable 38b through the first opening 46, and push the end through the passage 36, the second opening 48, and the passage in the back wall of the storage compartment 60. Next, one may couple the end 70 to the PDA 44; place the PDA in the storage compartment 60; and close the door 62 to the storage compartment. Then, one may couple the connector 58 to the connector 54 to complete the coupling of the PDA 44 to the processing circuitry. To couple the camera 40 to the circuitry, one may first insert the end 72 of the cable 38a through the first opening 46 and push the end toward the auxiliary opening 50. When the end 72 is adjacent the auxiliary opening 50, one may grasp the end and pull it through the auxiliary opening. Next, one may couple the end 72 to the camera 40 and place the camera on top of the storage compartment's door 62. Next, one may couple the connector 56 to the connector 52 to complete the coupling of the camera 40 to the circuitry.

Figure 3:
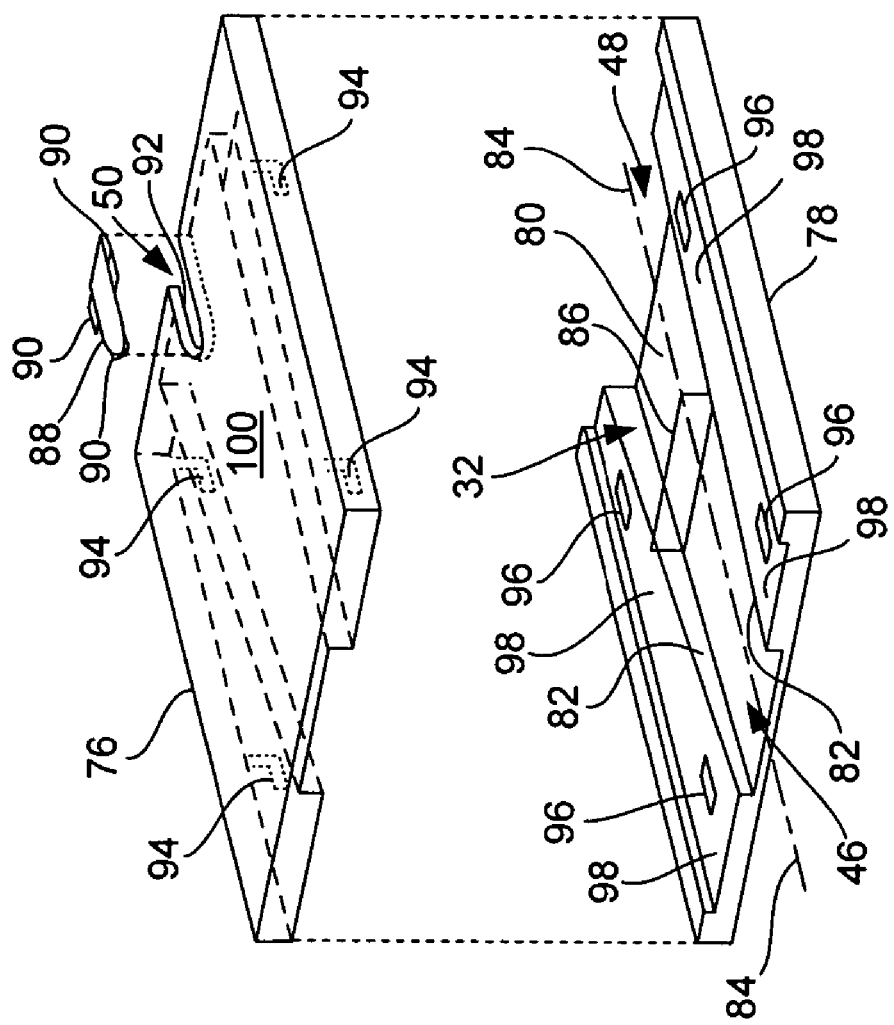
FIG. 3 is a perspective, exploded view of the conduit in FIG. 2 according to an embodiment of the invention.

FIG. 3 is a perspective, exploded view of a portion of the housing 34 in FIG. 2 that incorporates the passage 32 according to an embodiment of the invention. The housing 34 includes a top 76, and a body 78 having a bottom 80 and a sidewall 82 that together with the top define the passage 32 when the top is fastened to the body. The top 76 may be releasably fastened to the body 78, or the top may be integral with the body. The top 76 and body 78 may be made of any desirable material. For example, in one embodiment the top 76 and body 78 are formed by casting conventional plastic in a mold.

The passage 32 may have any desired shape. For example, in one embodiment the first and second openings 46 and 48 (FIG. 3) that are formed when the top 76 is fastened to the body 78 may be aligned, and the passage 32 may be substantially rectangular. The passage 32 includes a longitudinal axis 84, and a cross-section 86 that is substantially perpendicular to the axis 84 and has an area. The first and second openings 46 and 48 have respective areas substantially perpendicular to the axis 84. In one embodiment, the area of the first opening 46 is less than the area of the second opening 48, and the passage 32 tapers such that the area of the cross-section 86 increases as the distance of the cross-section from the first opening 46 increases.

Other embodiments are contemplated. For example, the first and second openings 46 and 48 may not be aligned and the passage 32 may curve as it extends from the first opening toward the second opening. In another example, the passage may include a chamber that has a large cross-sectional area to allow one to coil a cable in the passage, and thus, dispose a longer section of the cable in the passage. This may be desirable when a device is located a short distance away from the processor but the cable used to couple the device to the processor is long.

Still referring to FIG. 3, the passage 32 may include the auxiliary opening 50 to allow the cable 38a (FIG. 2) to extend through the passage without having to pass through both openings 46 and 48. For example, in one embodiment, the passage 32 includes the auxiliary opening 50 through the top 76, and the top includes a cap 88 that may be moved relative to the top to open and close the auxiliary opening. The cap 88 includes tabs 90, and the top 76 includes receptacles 92 (only one shown for clarity) each sized to receive a respective one of the tabs to retain the cap when the auxiliary opening 50 is closed. To open the auxiliary opening 50, one moves the cap 88 parallel to the axis 84 to withdraw the tabs 90 from the respective slots 92, and thus separate the cap 88 from the top 76.

Other embodiments are contemplated. For example, the passage 32 may include an auxiliary opening through the bottom or sidewall. In another example, the passage 32 may include more than one auxiliary opening. In another example, Velcro® (not shown) may fasten the cap 88 to the top. In yet another example, a hinge may fasten the cap 88 to the top, and thus the cap could be pivoted relative to the top to open and close the auxiliary opening 50.

The auxiliary opening 50 may be desirable when the availability of the opening 48 is restricted. For example, the second opening 48 may open to the interior (not shown) of the storage compartment 60, as discussed above in conjunction with FIG. 2, and thus require one to extend the cable 38a into or through the storage compartment's interior to extend the cable through the passage 32. This may be difficult if the storage compartment is occupied by a device that is not to be coupled to the cable 38a. But, with the auxiliary opening 50 located through the top 76, the cable 38a can avoid the storage compartment 60 when coupling an external device, such as the camera 40 to the processing circuitry (not shown) via the passage 32.

Still referring to FIG. 3, the top 76 may be releasably fastened to the body 78, and the body may be fastened, releasably or not, to the remainder of housing 34 (FIG. 2) or the body may be integral with the remainder of the housing. For example, in one embodiment the top 76 includes posts 94, and the body 78 includes slots 96 each sized to receive a respective post. To fasten the top 76 to the body 78, one first aligns each post 94 with a respective one of the slots 96 and inserts each post into the respective slots by moving the top toward the body. Then, one moves the top 76 parallel to the axis 84 to locate each post 94 beneath the wall 98 of the body 78, and thus retain the top to the body. The body 78 may be fastened to the housing using conventional fastening techniques such as gluing.

Other embodiments are contemplated. For example, Velcro® (not shown) may fasten the top 76 to the body 78. In another example, one or more screws or an adhesive may fasten the top 76 to the body 78.

Still referring to FIG. 3, the top 76 includes a top surface 100 that may be shaped as desired. For example, in one embodiment the top surface 100 is substantially flat and able to support a device placed on top of it. In other embodiments, the top 76 may include a receptacle in the outer surface 100 sized to receive and retain a device, or the outer surface 100 may be concave or convex.

The preceding discussion is presented to enable one skilled in the art to make and use the invention. Various modifications to the disclosed embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A housing for an electronic system, the housing comprising:
   an interface opening operable to expose an interface connector that is mounted to an interface held by the housing and coupled to circuitry disposed within the housing; and
   a passage having a first opening adjacent to the interface opening, having a second opening and a third opening, wherein at least one of the openings opens to an environment outside the housing without exposing the circuitry to the outside environment, the circuitry disposed in the housing not being disposed in the passage, the passage being operable to hold a communication medium that includes a communication connector attached to the interface connector and that extends from the interface connector through the first opening and the second or third openings.

2. The housing of claim 1 wherein the housing includes:
   a back comprising the interface opening, and
   a top covering the passage.

3. The housing of claim 1 wherein the third opening is adjacent the second opening.

4. The housing of claim 1 wherein:
   the third opening is adjacent the second opening, and
   the housing includes a top covering the passage, and a cap operable to close the third opening.

5. The housing of claim 1 wherein the passage is substantially straight.

6. The housing of claim 1 wherein the passage is substantially rectangular.

7. The housing of claim 1 wherein:
   the first opening has an area,
   the second opening has an area, and
   the area of the first opening does not equal the area of the second opening.

8. The housing of claim 1 wherein:
   the first opening has an area,
   the second opening has an area, and
   the area of the first opening is smaller than the area of the second opening.

9. The housing of claim 1 wherein the passage tapers.

10. The housing of claim 1 wherein:
    the housing further comprises a storage compartment, and
    the second opening opens to the storage compartment.

11. The housing of claim 1 wherein:
    the housing further comprises a storage compartment, and includes a top covering the passage, and
    the third opening is located on the top, and the second opening opens to the storage compartment.

12. The housing of claim 1 wherein the communication medium extends through the interface opening.

13. The electronic system of claim 1 wherein the housing includes a top that covers the passage to form a tunnel.

14. The electronic system of claim 1 wherein the housing includes a top releasably fastened to at least one of the sidewalls to convert the passage into a tunnel.

15. The electronic system of claim 1 wherein the system is a personal computer.

16. An electronic system, comprising:
    circuitry having an interface; and
    a housing that holds the circuitry, the housing defining an interface opening in which the interface is mounted and defining a passage having a first opening adjacent to the interface, having a second opening and a third opening, the circuitry that the housing holds not being disposed in the passage, the passage being operable to hold a communication medium coupled to the interface and to a device external to the housing without exposing the circuitry to the outside environment, wherein the medium extends from the interface through the first opening, and the second or third openings.

17. The system of claim 16 wherein the communication medium comprises a cable.

18. A computer system, comprising:
    computer circuitry having an interface; and
    a housing that holds the circuitry, the housing defining an interface opening in which the interface is mounted and defining a passage having a first opening adjacent to the interface, having a second opening and a third opening, the circuitry held by the housing not being disposed in the passage, the passage being operable to hold a communication medium coupled to the interface and to a device external to the housing without exposing the circuitry to the outside environment, wherein the medium extends from the interface through the first opening, and the second or third openings.

19. A method for coupling an external device to an interface mounted to a housing of an electronic system, the housing defining a passage and holding circuitry of the electronic system, the method comprising:
    connecting a communication medium to the interface;
    inserting the communication medium through the passage via first and second passage openings, the first opening being adjacent to the interface and the second opening being adjacent to the external device, the circuitry that the housing holds not being disposed in the passage; and
    connecting the communication medium to the external device.

20. The method of claim 19 wherein the second opening opens to an interior of a storage compartment defined by the housing.

21. The method of claim 19 wherein the second opening opens to an environment outside the housing.

22. The method of claim 19 further comprising disposing the external device on top of a storage compartment defined by the housing.

23. The method of claim 19 further comprising storing the external device in a storage compartment defined by the housing.

24. The method of claim 19 further comprising disposing the external device on top of the passage.

25. The method of claim 19 further comprising:
    connecting a second communication medium to the interface;

inserting the second medium through the passage via the first passage opening and a third passage opening, the third opening being adjacent to a second external device; and connecting the second medium to the second external device.

26. An electronic system comprising:

circuitry including an interface and a processor operable to execute a program that causes the processor to perform a function;

a housing containing the circuitry and having a back that holds the interface; and a passage defined by a portion of the housing that has a sidewall and a bottom, the bottom disposed between the passage and the circuitry, the passage having a first opening adjacent the interface, a second opening, and a third opening, the circuitry that the housing contains not being disposed in the passage, the passage being operable to hold a communication medium coupled to the interface and to a device external to the housing without exposing the circuitry in the housing to the outside environment, wherein the medium extends from the interface through the first opening, and the second or third openings.

* * * * *